United States Patent
Seshadri et al.

(10) Patent No.: US 11,543,555 B2
(45) Date of Patent: Jan. 3, 2023

(54) METHOD TO ESTIMATE FORMATION RESISTIVITY

(71) Applicant: Halliburton Energy Services, Inc., Houston, TX (US)

(72) Inventors: Muralidhar Seshadri, Sugarland, TX (US); David Ronald Beard, Houston, TX (US); Gary Wayne Kainer, Tomball, TX (US); Baris Guner, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/615,071

(22) PCT Filed: Apr. 10, 2019

(86) PCT No.: PCT/US2019/026819
§ 371 (c)(1),
(2) Date: Nov. 19, 2019

(87) PCT Pub. No.: WO2019/199992
PCT Pub. Date: Oct. 17, 2019

(65) Prior Publication Data
US 2021/0018645 A1    Jan. 21, 2021

Related U.S. Application Data

(60) Provisional application No. 62/656,203, filed on Apr. 11, 2018.

(51) Int. Cl.
*G01V 3/20* (2006.01)
*G01V 3/38* (2006.01)
(Continued)

(52) U.S. Cl.
CPC .................. *G01V 3/20* (2013.01); *G01V 3/38* (2013.01); *E21B 41/00* (2013.01); *E21B 47/00* (2013.01);
(Continued)

(58) Field of Classification Search
CPC ... G01V 3/20; G01V 3/38; G01V 3/24; G01V 3/00; G01V 3/08; G01V 3/18; G01V 3/26;
(Continued)

(56) References Cited

U.S. PATENT DOCUMENTS 3,060,373 A    10/1962  Doll
3,132,298 A     5/1964  Doll et al.
(Continued)

FOREIGN PATENT DOCUMENTS

CA         685727     5/1964
CA      2618735 A1 *  5/2007  ............... G01V 3/24
(Continued)

OTHER PUBLICATIONS

ISRWO International Search Report and Written Opinion for PCT/US2019/026819 dated Jul. 29, 2019.
(Continued)

*Primary Examiner* — Daniel R Miller
*Assistant Examiner* — Christian T Bryant
(74) *Attorney, Agent, or Firm* — John Wustenberg; C. Tumey Law Group PLLC

(57) ABSTRACT

A method and system for estimating a resistivity of a formation. A method for estimating a resistivity of a formation may comprise disposing a downhole tool into a borehole, wherein the downhole tool comprises a pad, an injector electrode, and a return electrode, injecting a current signal into the formation from the injector electrode, measuring a voltage signal between the injector electrode and the return
(Continued)

electrode; and determining a formation resistivity and a formation dielectric constant from at least one of the voltage signal, at least one property of the downhole tool, and at least one property of the borehole. A system for estimating a resistivity of a formation may comprise a downhole tool. The downhole tool may comprise a pad, wherein the pad comprises an injector electrode and a return electrode. The system may further comprise a conveyance for disposing the downhole tool in a borehole and an information handling system.

22 Claims, 5 Drawing Sheets

(51) Int. Cl.
| | |
|---|---|
| *G01V 3/24* | (2006.01) |
| *G01V 3/00* | (2006.01) |
| *G01V 3/18* | (2006.01) |
| *E21B 49/00* | (2006.01) |
| *E21B 41/00* | (2006.01) |
| *E21B 47/00* | (2012.01) |
| *G01V 3/26* | (2006.01) |
| *G01V 3/08* | (2006.01) |
| *E21B 47/12* | (2012.01) |

(52) U.S. Cl.
CPC ............... *E21B 47/12* (2013.01); *E21B 49/00* (2013.01); *G01V 3/00* (2013.01); *G01V 3/08* (2013.01); *G01V 3/18* (2013.01); *G01V 3/24* (2013.01); *G01V 3/26* (2013.01)

(58) Field of Classification Search
CPC .......... E21B 47/00; E21B 49/00; E21B 41/00; E21B 47/12
See application file for complete search history.

(56) References Cited

U.S. PATENT DOCUMENTS

| | | | |
|---|---|---|---|
| 3,379,963 A | 4/1968 | Saurenman | |
| 3,379,964 A | 4/1968 | Segesman | |
| 3,579,098 A | 5/1971 | Mougne | |
| 4,251,773 A | 2/1981 | Cailliau et al. | |
| 4,468,623 A | 8/1984 | Gianzero et al. | |
| 4,545,242 A | 10/1985 | Chan | |
| 4,567,759 A | 2/1986 | Ekstrom et al. | |
| 4,692,908 A | 9/1987 | Ekstrom et al. | |
| 4,851,781 A | 7/1989 | Marzetta et al. | |
| 4,862,090 A | 8/1989 | Vannier et al. | |
| 5,008,625 A | 4/1991 | Chen | |
| 5,012,193 A | 4/1991 | Chen | |
| 5,038,378 A | 8/1991 | Chen | |
| 6,191,588 B1 | 2/2001 | Chen | |
| 6,809,521 B2 | 10/2004 | Tabarovsky et al. | |
| 6,815,954 B2 | 11/2004 | Iwanicki et al. | |
| 7,397,250 B2 | 7/2008 | Bespalov et al. | |
| RE42,493 E | 6/2011 | Tabarovsky et al. | |
| 8,579,037 B2 | 11/2013 | Jacob | |
| 8,754,651 B2 | 6/2014 | Habashy et al. | |
| 9,158,025 B2 | 10/2015 | Forgang | |
| 2007/0046290 A1* | 3/2007 | Bespalov ................ | G01V 3/24 324/367 |
| 2008/0272789 A1* | 11/2008 | San Martin ............. | G01V 3/24 324/355 |
| 2008/0303525 A1 | 12/2008 | Itskovich et al. | |
| 2010/0023268 A1* | 1/2010 | Gold ...................... | G01V 3/24 702/9 |
| 2010/0039115 A1 | 2/2010 | Bespalov et al. | |
| 2015/0185354 A1 | 7/2015 | Hayman | |
| 2016/0131791 A1* | 5/2016 | Wu ......................... | G01V 3/38 702/7 |
| 2016/0282503 A1 | 9/2016 | Hou et al. | |
| 2017/0123097 A1 | 5/2017 | Fang | |
| 2017/0212269 A1 | 7/2017 | Itskovich et al. | |
| 2017/0227666 A1* | 8/2017 | Legendre ................ | G01V 3/20 |

FOREIGN PATENT DOCUMENTS

| | | | | |
|---|---|---|---|---|
| GB | 2389601 A | * | 12/2003 | ............. E21B 47/26 |
| WO | WO-2017014871 A1 | * | 1/2017 | ............. E21B 49/10 |
| WO | 2017086969 | | 5/2017 | |
| WO | 2019177588 | | 9/2019 | |

OTHER PUBLICATIONS

Yong-Hua Chen, et al., Inversion-Based Workflow for Quantitative Interpretation of the New-Generation Oil-Based Mud Resistivity Imager, SPWLA, May 2014.
Schlumberger, Quanta Geo, Photorealistic Reservoir Geology service, 2014.
Baker Hughes, GeoXplorer Imaging Service, Enhanced Resistivity Imaging in Nonconductive Muds, 2018.
Weatherford, Logging-while-Drilling Technology, 2018.
Halliburton, X-tended Range Micro Imager (XRMI™) Tool, H03629, Apr. 2012.
Halliburton, Oil Mud Reservoir Imager (OMRI™) Tool, H05346, Feb. 2016.
Halliburton, AFR™ Azimuthal Focused Resistivity Sensor, H013193, May 2019.
Halliburton, HFBI, High-Fidelity Borehole Imager, 2020.
SPWLA 61st Annual Logging Symposium, Guner, et al., Quantitative Demonstration of a High-Fidelity Oil-Based Mud Resistivity Imager using a Controlled Experiment, Jun. 24 to Jul. 29, 2020.
Chen, et al. A Novel Array Laterolog Method, Oct. 1998.
SPWLA 38th Annual Logging Symposium, Vigne, et al., Strange Invasion Profiles: What Multiarray Induction Logs can tell us about how Oil-Based Mud affects the invasion process and wellbore stability, Jun. 1997.
SPE22726, Safinya, et al., Improved Formation Imaging with Extended Microelectrical Arrays, 1991.
SPE30584, Smits, et al., High Resolution from a New Laterolog with Azimuthal Imaging, 1995.
SPE Formation Evaluation, Davies, et al., Azimuthal Resistivity Imaging: A New-Generation Laterolog, Sep. 1994.
SPE401, Suau, et al., The Dual Laterolog-R Tool, Jul. 1973.

* cited by examiner

METHOD TO ESTIMATE FORMATION RESISTIVITY

BACKGROUND

Boreholes drilled into subterranean formations may enable recovery of desirable fluids (e.g., hydrocarbons) using a number of different techniques. A downhole tool may be employed in subterranean operations to determine borehole and/or formation properties.

Traditionally, borehole imager tools may be used in obtaining a detailed characterization of reservoirs. These borehole imager tools may provide a resistivity image of the formation immediately surrounding the borehole. In essence, their function is the electrical equivalent of the formation coring, with much higher borehole coverage. Borehole imager tools may be used to determine formation stratigraphy, dips of the formation layers as well as, borehole and formation stress. Borehole imager tools may be particularly important in learning about thin beds and fracture locations. Oil based muds may provide higher performance than the water-based muds and may be preferable in deep water environments where high temperature and pressure cause loss of water and in shale zones where water may cause swelling. However, oil-based mud may be highly resistive. At low frequencies, this resistance may reduce the sensitivity of the borehole imager tools to the outside formation. Thus, accurately estimating formation resistivity from a downhole tool in oil-based-mud is difficult. This may be due to the influence of mud properties, button standoff and formation dielectric properties on impedance measurements.

BRIEF DESCRIPTION OF THE DRAWINGS

For a detailed description of the preferred examples of the disclosure, reference will now be made to the accompanying drawings in which.

DETAILED DESCRIPTION

The present disclosure relates generally to a system and method to estimate true formation resistivity accurately using measurements of formation impedance at multiple frequencies. More particularly, the present disclosure may relate to utilizing existing hardware to provide accurate estimates of formation resistivity across a wide range of resistivity values.

Figure 1:
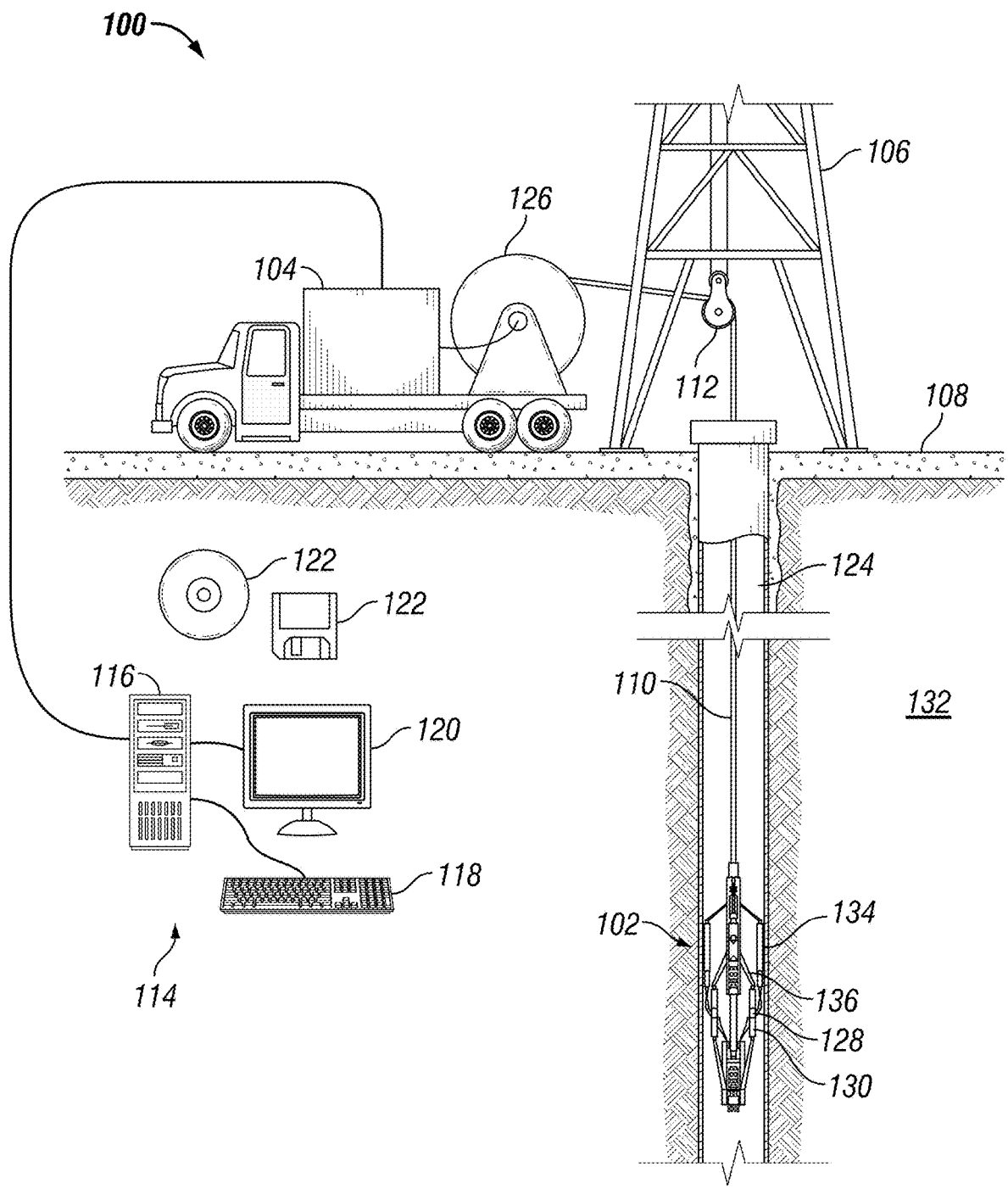
FIG. 1 illustrate an example of a well measurement system.

FIG. 1 illustrates a cross-sectional view of a well measurement system 100. As illustrated, well measurement system 100 may include downhole tool 102 attached to a vehicle 104. In examples, it should be noted that downhole tool 102 may not be attached to a vehicle 104. Downhole tool 102 may be supported by rig 106 at surface 108. Downhole tool 102 may be tethered to vehicle 104 through conveyance 110. Conveyance 110 may be disposed around one or more sheave wheels 112 to vehicle 104. Conveyance 110 may include any suitable means for providing mechanical conveyance for downhole tool 102, including, but not limited to, wireline, slickline, coiled tubing, pipe, drill pipe, drill string, downhole tractor, or the like. In some examples, conveyance 110 may provide mechanical suspension, as well as electrical connectivity, for downhole tool 102. Conveyance 110 may include, in some instances, a plurality of electrical conductors extending from vehicle 104. Conveyance 110 may include an inner core of seven electrical conductors covered by an insulating wrap. An inner and outer steel armor sheath may be wrapped in a helix in opposite directions around the conductors. The electrical conductors may be used for communicating power and telemetry between vehicle 104 and downhole tool 102. Information from downhole tool 102 may be gathered and/or processed by information handling system 114. For example, signals recorded by downhole tool 102 may be stored on memory and then processed by downhole tool 102. The processing may be performed real-time during data acquisition or after recovery of downhole tool 102. Processing may alternatively occur downhole or may occur both downhole and at surface. In some examples, signals recorded by downhole tool 102 may be conducted to information handling system 114 by way of conveyance 110. Information handling system 114 may process the signals, and the information contained therein may be displayed for an operator to observe and stored for future processing and reference. Information handling system 114 may also contain an apparatus for supplying control signals and power to downhole tool 102.

Systems and methods of the present disclosure may be implemented, at least in part, with information handling system 114. While shown at surface 108, information handling system 114 may also be located at another location, such as remote from borehole 124. Information handling system 114 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 114 may be a processing unit 116, a network storage device, or any other suitable device and may vary in size, shape, performance, functionality, and price. Information handling system 114 may include random access memory (RAM), one or more processing resources such as a central processing unit (CPU) or hardware or software control logic, ROM, and/or other types of nonvolatile memory. Additional components of the information handling system 114 may include one or more disk drives, one or more network ports for communication with external devices as well as an input device 118 (e.g., keyboard, mouse, etc.) and video display 120. Information handling system 114 may also include one or more buses operable to transmit communications between the various hardware components.

Alternatively, systems and methods of the present disclosure may be implemented, at least in part, with non-transitory computer-readable media 122. Non-transitory computer-readable media 122 may include any instrumentality or aggregation of instrumentalities that may retain data and/or instructions for a period of time. Non-transitory computer-readable media 122 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such as wires, optical fibers, microwaves, radio waves, and other electromagnetic and/or optical carriers; and/or any combination of the foregoing.

As discussed below, methods may utilize an information handling system 114 to determine and display a high-resolution resistivity image of formation 132 immediately surrounding borehole 124. This high-resolution resistivity image may depict boundaries of subsurface structures, such as a plurality of layers disposed in formation 132. These images may be used in reservoir characterization. Images with high resolution may allow accurate identification of thin beds and other fine features such as fractures, clasts and vugs. These images may provide information about the sedimentology, lithology, porosity and permeability of formation 132. The images may complement, or in some cases replace, the process of coring.

In examples, rig 106 includes a load cell (not shown) which may determine the amount of pull on conveyance 110 at the surface of borehole 124. Information handling system 114 may include a safety valve which controls the hydraulic pressure that drives drum 126 on vehicle 104 which may reel up and/or release conveyance 110 which may move downhole tool 102 up and/or down borehole 124. Conveyance 110 may provide a means of disposing downhole tool 102 into borehole 124. The safety valve may be adjusted to a pressure such that drum 126 may only impart a small amount of tension to conveyance 110 over and above the tension necessary to retrieve conveyance 110 and/or downhole tool 102 from borehole 124. The safety valve is typically set a few hundred pounds above the amount of desired safe pull on conveyance 110 such that once that limit is exceeded; further pull on conveyance 110 may be prevented.

Downhole tool 102 may include a plurality of electrodes, such as button array 128. Downhole tool 102 may also include a return electrode 130. It should be noted that the plurality of electrodes of button array 128 may be any suitable electrode and is should be further noted that return electrode 130 may be any suitable electrode. Button array 128 and/or return electrode 130 may be disposed on at least one pad 134 in any suitable order. For example, a pad 134 may include only button arrays 128 and/or return electrodes 130. Further, a pad 134 may include both button array 128 and return electrodes 130. Pads 134 may be attached to at least one arm 136 that may extend from downhole tool 102. Arm 136 may extend pad 134 away from downhole tool 102. In examples, arm 136 may place pad 134 in contact with borehole 124. It should be noted that there may be a plurality of arms 136. One or more arms 136 may place an arrangement of button arrays 128 and/or return electrode 130 in close proximity to the wall of borehole 124.

During operations, an operator may energize an individual electrode, or any number of electrodes, of button array 128. A voltage may be applied between the electrode and return electrode 130. The level of the voltage may be controlled by information handling system 114. This may cause currents to be transmitted through the electrode of button array 128. It should be noted that there may be any number of currents transmitted into formation 132. These currents may travel through the mud disposed in borehole 124 and formation 132 and may reach back to return electrode 130. The amount of current emitted by each electrode may be inversely proportional to the impedance seen by the electrode. This impedance may be affected by the properties of formation 132 and the mud directly in front of each electrode of button array 128. Therefore, current emitted by each electrode may be measured and recorded in order to obtain an image of the resistivity of formation 132.

To produce a resistivity image of formation 132, a current may be transmitted from at least one electrode of button array 128 and return to return electrode 130. These two electrodes may be referred to as the current electrodes. Then, the voltage drop across the electrode of button array 128 may be measured and used to estimate the impedance of formation 132. In these alternative implementations, electrodes may be referred to as voltage electrodes or monitor electrodes. Proposed method may operate in any of the two designs above or any other similar oil-based mud resistivity imager tool without any limitations.

In examples, downhole tool 102 may operate with additional equipment (not illustrated) on surface 108 and/or disposed in a separate well measurement system (not illustrated) to record measurements and/or values from formation 132 to render a resistivity image of formation 132. Without limitation, downhole tool 102 may be connected to and/or controlled by information handling system 114, which may be disposed on surface 108. Without limitation, information handling system 114 may be disposed down hole in downhole tool 102. Processing of information recorded may occur down hole and/or on surface 108. In addition to, or in place of processing at surface 108, processing may occur downhole. Processing occurring downhole may be transmitted to surface 108 to be recorded, observed, and/or further analyzed. Additionally, information recorded on information handling system 114 that may be disposed down hole may be stored until downhole tool 102 may be brought to surface 108. In examples, information handling system 114 may communicate with downhole tool 102 through a fiber optic cable (not illustrated) disposed in (or on) conveyance 110. In examples, wireless communication may be used to transmit information back and forth between information handling system 114 and downhole tool 102. Information handling system 114 may transmit information to downhole tool 102 and may receive as well as process information recorded by downhole tool 102. In examples, a downhole information handling system (not illustrated) may include, without limitation, a microprocessor or other suitable circuitry, for estimating, receiving and processing signals from downhole tool 102. Downhole information handling system (not illustrated) may further include additional components, such as memory, input/output devices, interfaces, and the like. In examples, while not illustrated, downhole tool 102 may include one or more additional components, such as analog-to-digital converter, filter and amplifier, among others, that may be used to process the measurements of downhole tool 102 before they may be transmitted to surface 108. Alternatively, raw measurements from downhole tool 102 may be transmitted to surface 108.

Any suitable technique may be used for transmitting signals from downhole tool 102 to surface 108. As illustrated, a communication link (which may be wired or wireless and may be disposed in conveyance 110, for example) may be provided that may transmit data from downhole tool 102 to an information handling system 114 at surface 108.

Figure 2:
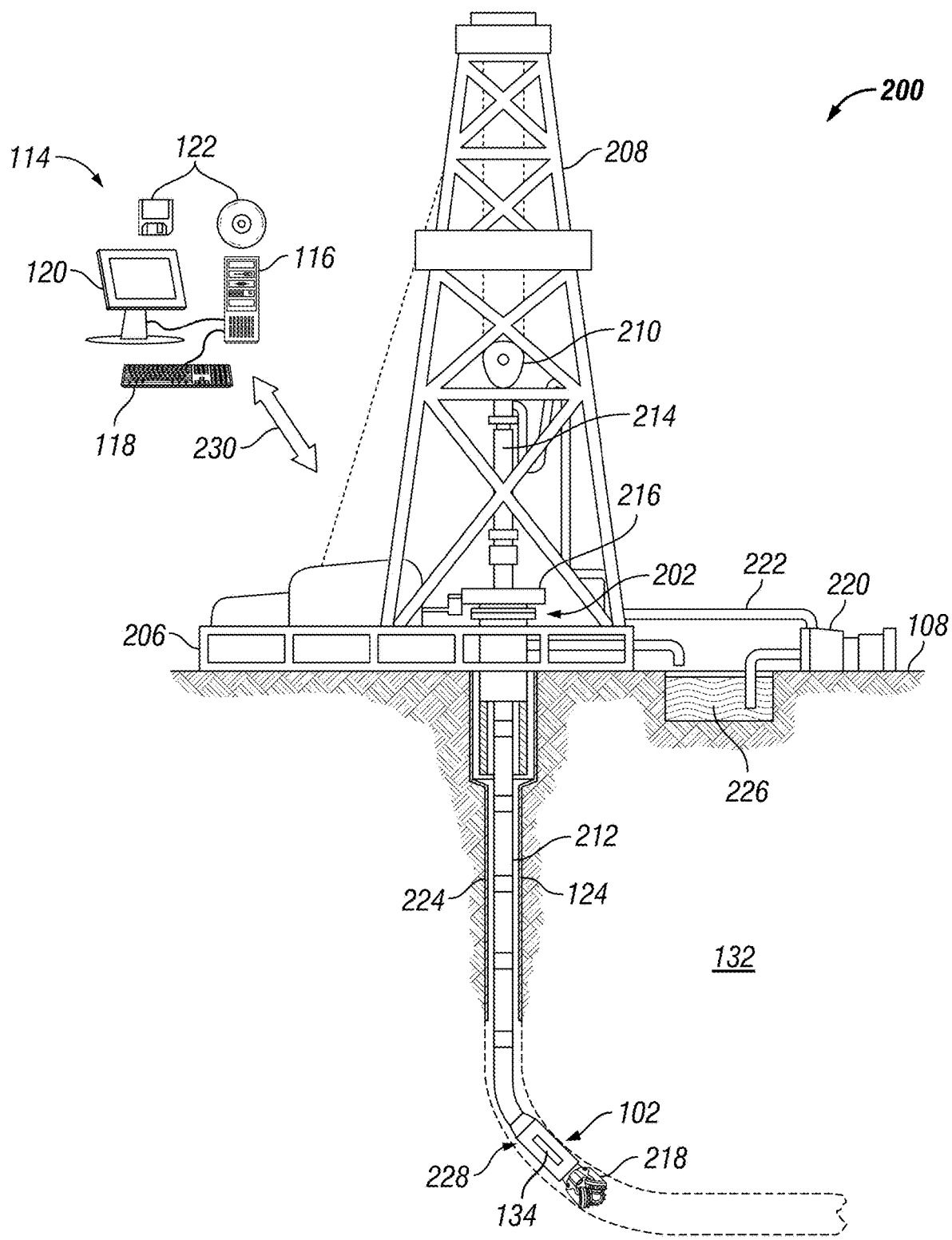
FIG. 2 illustrates another example of a well measurement system.

FIG. 2 illustrates an example in which downhole tool 102 may be disposed in a drilling system 200. As illustrated, borehole 124 may extend from a wellhead 202 into formation 132 from surface 108. Generally, borehole 124 may include horizontal, vertical, slanted, curved, and other types of borehole geometries and orientations. Imaging tools may be used in uncased sections of the borehole. Measurements may be made by imaging tools in cased sections for purposes such as calibration.

As illustrated, borehole 124 may extend through formation 132. As illustrated in FIG. 2, borehole 124 may extend generally vertically into the formation 132, however borehole 124 may extend at an angle through formation 132, such as horizontal and slanted boreholes. For example, although FIG. 2 illustrates a vertical or low inclination angle well, high inclination angle or horizontal placement of the well and equipment may be possible. It should further be noted that while FIG. 2 generally depicts a land-based operation, those skilled in the art may recognize that the principles described herein are equally applicable to subsea operations that employ floating or sea-based platforms and rigs, without departing from the scope of the disclosure.

As illustrated, a drilling platform 206 may support a derrick 208 having a traveling block 210 for raising and lowering drill string 212. Drill string 212 may include, but is not limited to, drill pipe and coiled tubing, as generally known to those skilled in the art. A kelly 214 may support drill string 212 as it may be lowered through a rotary table 216. A drill bit 218 may be attached to the distal end of drill string 212 and may be driven either by a downhole motor and/or via rotation of drill string 212 from surface 108. Without limitation, drill bit 218 may include, roller cone bits, PDC bits, natural diamond bits, any hole openers, reamers, coring bits, and the like. As drill bit 218 rotates, it may create and extend borehole 124 that penetrates various formations 132. A pump 220 may circulate drilling fluid through a feed pipe 222 to kelly 214, downhole through interior of drill string 212, through orifices in drill bit 218, back to surface 108 via annulus 224 surrounding drill string 212, and into a retention pit 226.

With continued reference to FIG. 2, drill string 212 may begin at wellhead 202 and may traverse borehole 124. Drill bit 218 may be attached to a distal end of drill string 212 and may be driven, for example, either by a downhole motor and/or via rotation of drill string 212 from surface 108. Drill bit 218 may be a part of bottom hole assembly 228 at distal end of drill string 212. Bottom hole assembly 228 may further include downhole tool 102. Downhole tool 102 may be disposed on the outside and/or within bottom hole assembly 228. Downhole tool 102 may include test cell 234. As will be appreciated by those of ordinary skill in the art, bottom hole assembly 228 may be a measurement-while drilling (MWD) or logging-while-drilling (LWD) system.

Without limitation, bottom hole assembly 228 may be connected to and/or controlled by information handling system 114, which may be disposed on surface 108. Without limitation, information handling system 114 may be disposed down hole in bottom hole assembly 228. Processing of information recorded may occur down hole and/or on surface 108. Processing occurring downhole may be transmitted to surface 108 to be recorded, observed, and/or further analyzed. Additionally, information recorded on information handling system 114 that may be disposed down hole may be stored until bottom hole assembly 228 may be brought to surface 108. In examples, information handling system 114 may communicate with bottom hole assembly 228 through a fiber optic cable (not illustrated) disposed in (or on) drill string 212. In examples, wireless communication may be used to transmit information back and forth between information handling system 114 and bottom hole assembly 228. Information handling system 114 may transmit information to bottom hole assembly 228 and may receive as well as process information recorded by bottom hole assembly 228. In examples, a downhole information handling system (not illustrated) may include, without limitation, a microprocessor or other suitable circuitry, for estimating, receiving and processing signals from bottom hole assembly 228. Downhole information handling system (not illustrated) may further include additional components, such as memory, input/output devices, interfaces, and the like. In examples, while not illustrated, bottom hole assembly 228 may include one or more additional components, such as analog-to-digital converter, filter and amplifier, among others, that may be used to process the measurements of bottom hole assembly 228 before they may be transmitted to surface 108. Alternatively, raw measurements from bottom hole assembly 228 may be transmitted to surface 108.

Any suitable technique may be used for transmitting signals from bottom hole assembly 228 to surface 108, including, but not limited to, wired pipe telemetry, mud-pulse telemetry, acoustic telemetry, and electromagnetic telemetry. While not illustrated, bottom hole assembly 228 may include a telemetry subassembly that may transmit telemetry data to surface 108. Without limitation, an electromagnetic source in the telemetry subassembly may be operable to generate pressure pulses in the drilling fluid that propagate along the fluid stream to surface 108. At surface 108, pressure transducers (not shown) may convert the pressure signal into electrical signals for a digitizer (not illustrated). The digitizer may supply a digital form of the telemetry signals to information handling system 114 via a communication link 230, which may be a wired or wireless link. The telemetry data may be analyzed and processed by information handling system 114.

As illustrated, communication link 230 (which may be wired or wireless, for example) may be provided that may transmit data from bottom hole assembly 228 to an information handling system 114 at surface 108. Information handling system 114 may include a processing unit 116 (Referring to FIG. 1), a video display 120 (Referring to FIG. 1), an input device 118 (e.g., keyboard, mouse, etc.) (Referring to FIG. 1), and/or non-transitory computer-readable media 122 (e.g., optical disks, magnetic disks) (Referring to FIG. 1) that may store code representative of the methods described herein. In addition to, or in place of processing at surface 108, processing may occur downhole.

Figure 3A:
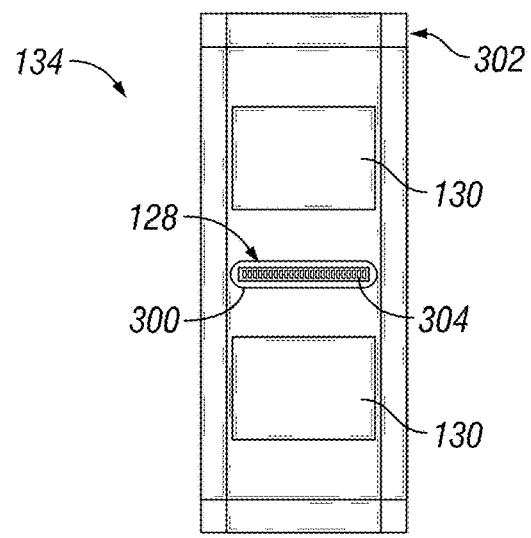
FIGS. 3A and 3B illustrates examples of pads.
Figure 3B:
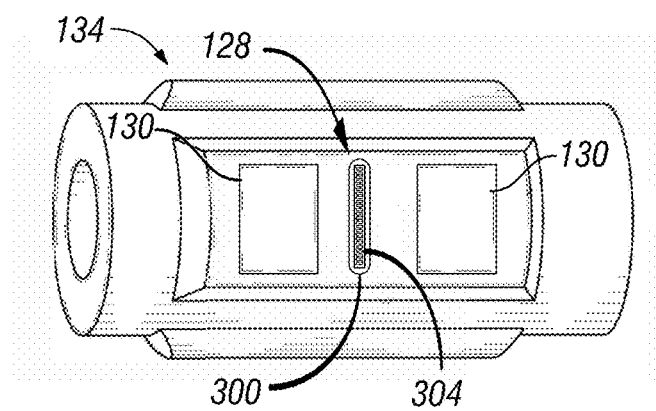

FIGS. 3A and 3B illustrates an example of pad 134. As illustrated, FIG. 3A is an example of a pad 134 that may be disposed on downhole tool 102 as seen in FIG. 1. In this example, pad 134 may be able to attach to one or more arms 136 (e.g., referring to FIG. 1). FIG. 3B illustrates a pad 134 that may be attached to downhole tool 102 on a bottom hole assembly 228 as illustrated in FIG. 2. In this example, pad 134 may be attached directly to downhole tool 102 and may not utilize one or more arms. Referring back to FIGS. 3A and 3B, pad 134 may serve to place button array 128 and/or return electrode 130 in contact with or in close proximity to borehole 124. Pad 134 may include a button array 128, a return electrode 130, a guard 300, and a housing 302. In examples, there may be a plurality of button arrays 128. Button array 128 may include an injector electrode 304, wherein injector electrode 304 may be a sensor that senses impedance of formation 132. There may be any suitable number of button electrodes 304 within button array 128 that may produce a desired, predetermined current. Without limitation, the range for a suitable number of button electrodes 304 within button array 128 may be from about one injector electrode 304 to about one hundred button electrodes 304. For example, the range for a suitable number of button electrodes 304 within button array 128 may be from about one injector electrode 304 to about twenty-five button electrodes 304, from about twenty-five button electrodes 304 to about fifty button electrodes 304, from about fifty button electrodes 304 to about seventy-five button electrodes 304, or from about seventy-five button electrodes 304 to about one hundred button electrodes 304.

In examples, there may be a plurality of return electrodes 130. One of the return electrodes 130 may be disposed on one side of button array 128, and another one of the return electrodes 130 may be disposed on the opposite side of button array 128. These return electrodes 130 may be disposed at equal distances away from button array 128 or at varying distances from button array 128. In examples, a voltage difference between button array 128 and return electrodes 130 may be applied, which may cause currents to be emitted from button array 128 into the mud (not illustrated) and formation 132 (e.g., referring to FIG. 1 or 2).

During operations, an operator may energize button array 128. A voltage may be applied between each injector electrode 304 and return electrode 130. The level of the voltage may be controlled by information handling system 114. This may cause currents to be transmitted through button array 128. These currents may travel through the mud and formation 132 and may reach back to return electrode 130. The amount of current emitted by each injector electrode 304 may be inversely proportional to the impedance seen by that injector electrode 304. This impedance may be affected by the properties of formation 132 and the mud directly in front of each injector electrode 304. Therefore, current emitted by each injector electrode 304 may be measured and recorded in order to obtain an image of the resistivity of formation 132.

In examples, a current may be transmitted from injector electrode 304 and return to return electrode 130. These two electrodes may be referred to as the current electrodes. Then, the voltage drop across button array 128 may be measured and used to estimate the impedance of formation 132. In these alternative implementations, button electrodes 304 may be referred to as voltage electrodes or monitor electrodes. Proposed method may operate in any of the two designs above or any other similar oil-based mud resistivity imager tool without any limitations. In the rest of the text, the imager tool will be assumed to be of the first design without any loss of generality.

Guard 300 may help to focus most of the current produced by button array 128 into formation 132 radially. Guard 300 may be disposed around button array 128. Guard 300 may include the same potential as button array 128.

In examples, housing 302 may serve to protect button array 128 and return electrodes 130 from the surrounding mud and formation 132. Housing may be made with any suitable material. Without limitation, suitable material may include metals, nonmetals, plastics, ceramics, composites and/or combinations thereof. In examples, housing 302 may be a metal plate. As noted above for FIG. 3A, in examples housing 302 may be connected through arm 136 to downhole tool 102 (e.g., referring to FIG. 1) or hosing 302 may be connected directly to downhole tool 102 on bottom hole assembly 228, as illustrated in FIG. 2 Furthermore, an insulating material may be used to fill the remaining portions of pad 134. In examples, ceramics may be used as the insulating material to fill the remaining portions of pad 134.

An impedance value may be calculated through the current transmitting between an injector electrode 304 and formation 132 for each injector electrode 304. The voltage between button array 128 and return electrodes 130 may be measured and divided by the transmitted current to produce a value for the impedance seen by each injector electrode 304. Most of the transmitted current may be returned to return electrodes 130 although some portions of it may return through housing 302 and downhole tool 102 (e.g., referring to FIG. 1).

Figure 4:
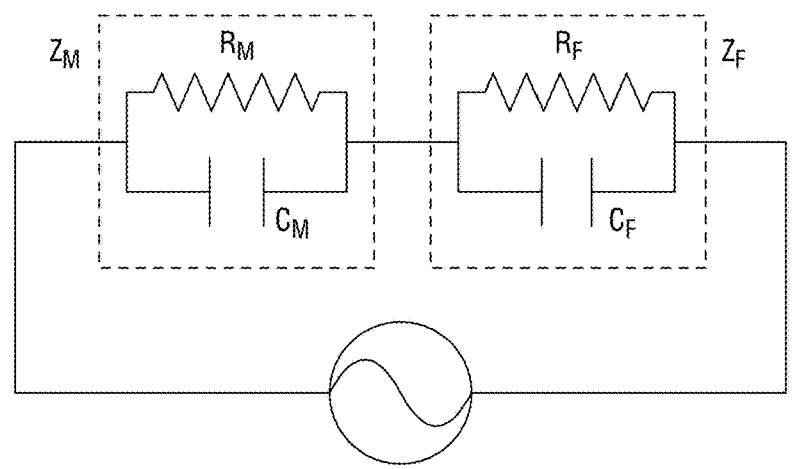
FIG. 4 illustrates an example of a circuit model of downhole mud impedance and formation impedance.

FIG. 4 illustrates an example of a circuit model 400 that may approximate downhole tool 102. For example, downhole tool 102 may be disposed in a borehole that may include oil-based mud. An electric current may be passed to formation 132 (e.g., referring to FIG. 1 or 2) between an injector electrode 304 and a return electrode 130 (e.g., referring to FIG. 3). In examples, current passes through a mud or a mud-cake between injector electrode 304 and return electrode 130 and formation 132. This is schematically represented by the circuit model 400 shown in FIG. 4. In examples, circuit model 400 may assume that: (a) the leakage of current is negligible; (b) the impedance contributions of all components other than formation 132 and the mud are ignored; and (c) the inductance of formation 132 as well as mud are neglected.

In FIG. 4, $Z_M$ and $Z_F$ are mud impedance and formation impedance, respectively. The measured impedance is a sum of the mud and formation impedances. $R_M$ and $R_F$ are the mud resistance and formation resistance, respectively, whereas $C_M$ and $C_F$ are the mud capacitance and formation capacitance, respectively. The mud and formation impedances may be written in complex notation as:

$$\frac{1}{Z_M} = \frac{1}{R_M} + j(2\pi f C_M) \qquad (1)$$

$$\frac{1}{Z_F} = \frac{1}{R_F} + j(2\pi f C_F) \qquad (2)$$

where, j is the square root of negative unity, and f is the frequency of the applied current. Formation 132 may be represented as a cylindrical impedance element of height d and cross-sectional area A with a resistivity of $\rho_F$ and relative dielectric constant of $k_F$, where d is the effective depth of investigation and A is the effective cross-sectional area of the electrode. Similarly, the mud is represented as a cylindrical impedance element of height h (the standoff) and cross-sectional area A, with a resistivity of $\rho_M$ and relative dielectric constant of $k_M$. As the variables are defined above, the measured impedance may be written as:

$$Z_{Total} = \frac{\left(\frac{\rho_M h}{A}\right)}{1 + j\left[2\pi f\left(\frac{\rho_M h}{A}\right)\left(\frac{k_M \varepsilon_0 A}{h}\right)\right]} + \frac{\left(\frac{\rho_F d}{A}\right)}{1 + j\left[2\pi f\left(\frac{\rho_F d}{A}\right)\left(\frac{k_F \varepsilon_0 A}{d}\right)\right]} \qquad (3)$$

where $\varepsilon_0$ is the dielectric permittivity of the vacuum. Further simplification may be found by multiplying the denominators of the two terms by their complex conjugates:

$$Z_{Total} = \left(\rho_M \frac{h}{A}\right)\left[\frac{1 - j[2\pi\varepsilon_0(\rho_M f k_M)]}{1 + [2\pi\varepsilon_0(\rho_M f k_M)]^2}\right] + \left(\rho_F \frac{d}{A}\right)\left[\frac{1 - j[2\pi\varepsilon_0(\rho_F f k_F)]}{1 + [2\pi\varepsilon_0(\rho_F f k_F)]^2}\right] \qquad (4)$$

where, A is the area of injector electrode 304 (e.g., Referring to FIG. 3) through which the current flows, and is known from the design. The parameter (d/A) is obtained from the calibration of the sensor.

The impedance may be measured at two different frequencies $f_1$ and $f_2$, which may be performed by four equations. Two equations from the real and two equations from the imaginary parts of the impedance measured at the two frequencies, as seen below:

$$Z_1 = \left(\rho_{M1}\frac{h}{A}\right)\left[\frac{1-j[2\pi\varepsilon_0(\rho_{M1}f_1k_{M1})]}{1+[2\pi\varepsilon_0(\rho_{M1}f_1k_{M1})]^2}\right] + \left(\rho_F\frac{d}{A}\right)\left[\frac{1-j[2\pi\varepsilon_0(\rho_F f_1k_F)]}{1+[2\pi\varepsilon_0(\rho_F f_1k_F)]^2}\right] \quad (5)$$

$$Z_2 = \left(\rho_{M2}\frac{h}{A}\right)\left[\frac{1-j[2\pi\varepsilon_0(\rho_{M2}f_2k_{M2})]}{1+[2\pi\varepsilon_0(\rho_{M2}f_2k_{M2})]^2}\right] + \left(\rho_F\frac{d}{A}\right)\left[\frac{1-j[2\pi\varepsilon_0(\rho_F f_2k_F)]}{1+[2\pi\varepsilon_0(\rho_F f_2k_F)]^2}\right] \quad (6)$$

where, $\rho_{M1}$ and $\rho_{M1}$ denote the mud resistivity at frequencies $f_1$ and $f_2$, respectively, whereas $k_{M1}$ and $k_{M2}$ denote the mud dielectric constant at frequencies $f_1$ and $f_2$, respectively. It may be assumed that variation of mud resistivity and mud dielectric constant with frequency are known:

$$\rho_{M2} = p(\rho_{M1}, f_1, f_2) \quad (7)$$

$$k_{M2} = q(k_{M1}, f_1, f_2) \quad (8)$$

where, p and q are functions that represent the variation of mud resistivity and mud dielectric constant, respectively, with frequency. As an example, a common assumption may be that the mud resistivity is inversely proportional to the frequency, and that the mud dielectric constant does not change with frequency:

$$\rho_{M2} = \rho_{M1} f_1/f_2 \quad (9)$$

$$k_{M2} = k_{M1} \quad (10)$$

Using Equations 5-8, an operator may solve exactly or approximately, using a deterministic sequence of computations with a finite number of steps, for the following six variables: $\rho_F$, $k_F$, $h\rho_{M1}$, $h\rho_{M2}$, $\rho_{M1}k_{M1}$, and $\rho_{M2}k_{M2}$. The first two, the formation resistivity and the formation dielectric constant, may further be used in for further to determine the composition of formation 132 around borehole 124 (e.g., referring to FIG. 1 or 2). The variables $h\rho_{M1}$ and $h\rho_{M2}$ may be used to calculate or estimate injector electrode 304 standoff h, which may be further used to determine characteristics of borehole geometry. Without limitation, characteristics of borehole geometry may include washout, borehole rugosity, vugs, and/or mudcake thickness. In examples, rugosity may be a measurement of a roughness of a borehole surface. Additionally, washout may be a characteristic covered by borehole rugosity and a vug may be a cavity or a hole in the borehole. Furthermore, mudcake may be defined as a deposition on the borehole surface due to a buildup of solid particles in mud disposed within the borehole.

In examples, a voltage signal V may be applied between injector electrode 304 and return electrode 130 of pad 134 contacting formation 132 (e.g., referring to FIGS. 1, 2, and 3), and measure the current signal I between injector electrode 304 and return electrode 130, where injector electrode 304 may inject a current signal I into formation 132.

In examples, more than two distinct frequencies may be used to determine the formation resistivity and formation dielectric constant using impedance measured at two distinct frequencies at a time. This may result in multiple estimates for formation resistivity and formation dielectric constant. Any statistical measure of the multiple estimates of the formation resistivity, such as the mean, median, frequency weighted mean, etc., may be used a representative value of the formation resistivity. Similarly, any statistical measure of the multiple estimates of the formation dielectric constant, such as the mean, median, frequency weighted mean, etc., may be used a representative value of the formation dielectric constant.

As described above, resistivity imaging may be performed without an inversion scheme or an algorithm scheme to determine formation resistivity. Additionally, as downhole tool 102 may be disposed in borehole 124 that may include oil-based muds an operator may not need to choose frequencies where the impedance of the mud is predominantly capacitive impedance. This may allow for frequency ranges where the contribution of formation impedance to total impedance may be detected accurately at two distinct frequencies.

Additionally, current practice may estimate formation resistivity as a weighted mean of measurements made at multiple depths/multiple frequencies. Disclosed methods above may use a relationship between measured formation impedance and frequency as given in Equation (5) and Equation (6), which may not require weighted mean of measurements. Additionally, the disclosed method may estimate a formation dielectric constant and the disclosed method may work at a low range (<1 Ωm) as well as a high range of resistivity (>100 Ωm).

Figures 5A, 5B, 5C:
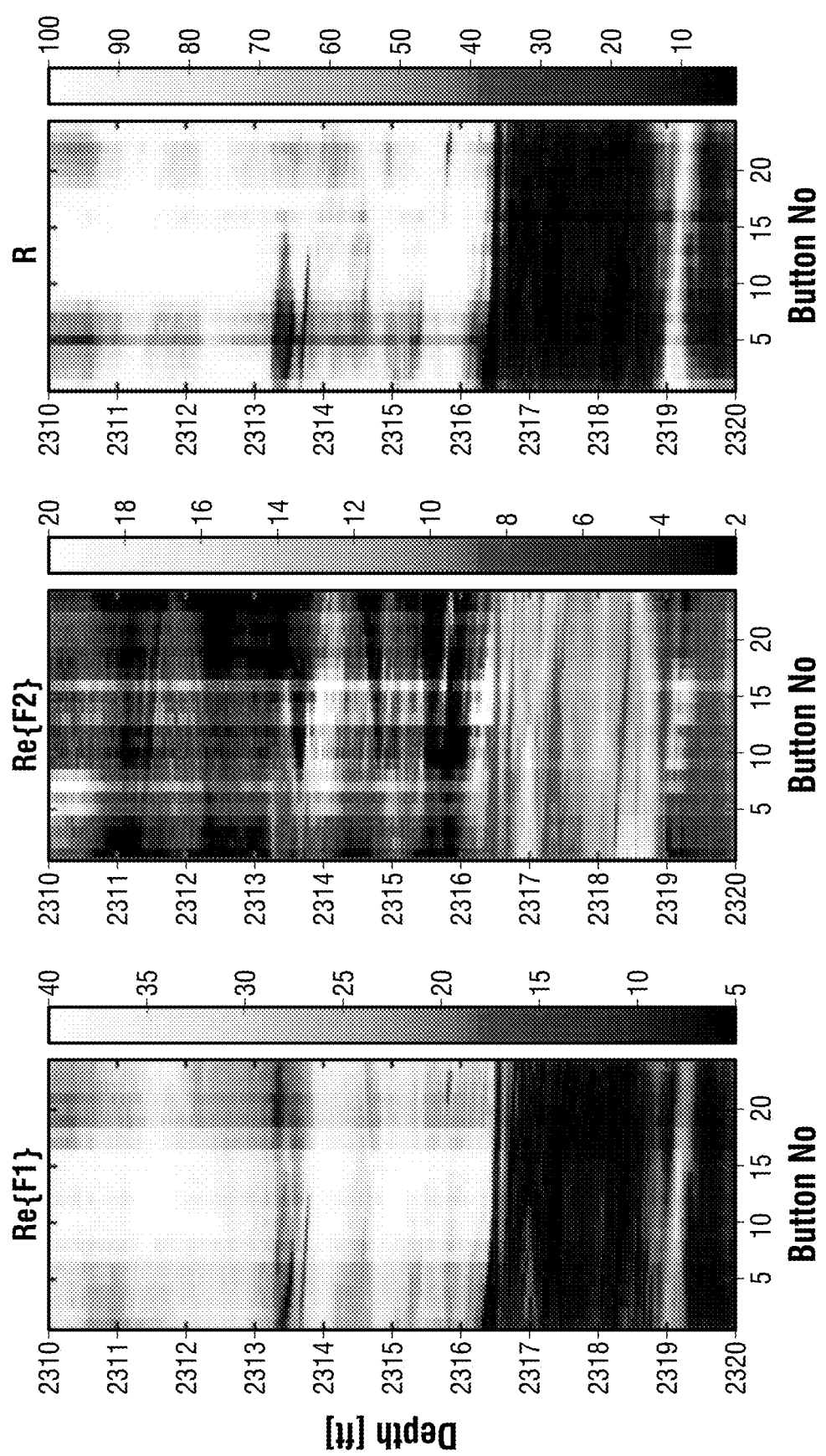
FIGS. 5A-5C illustrate a formation resistivity image from an impedance at two frequencies.
Figures 6A, 6B, 6C:
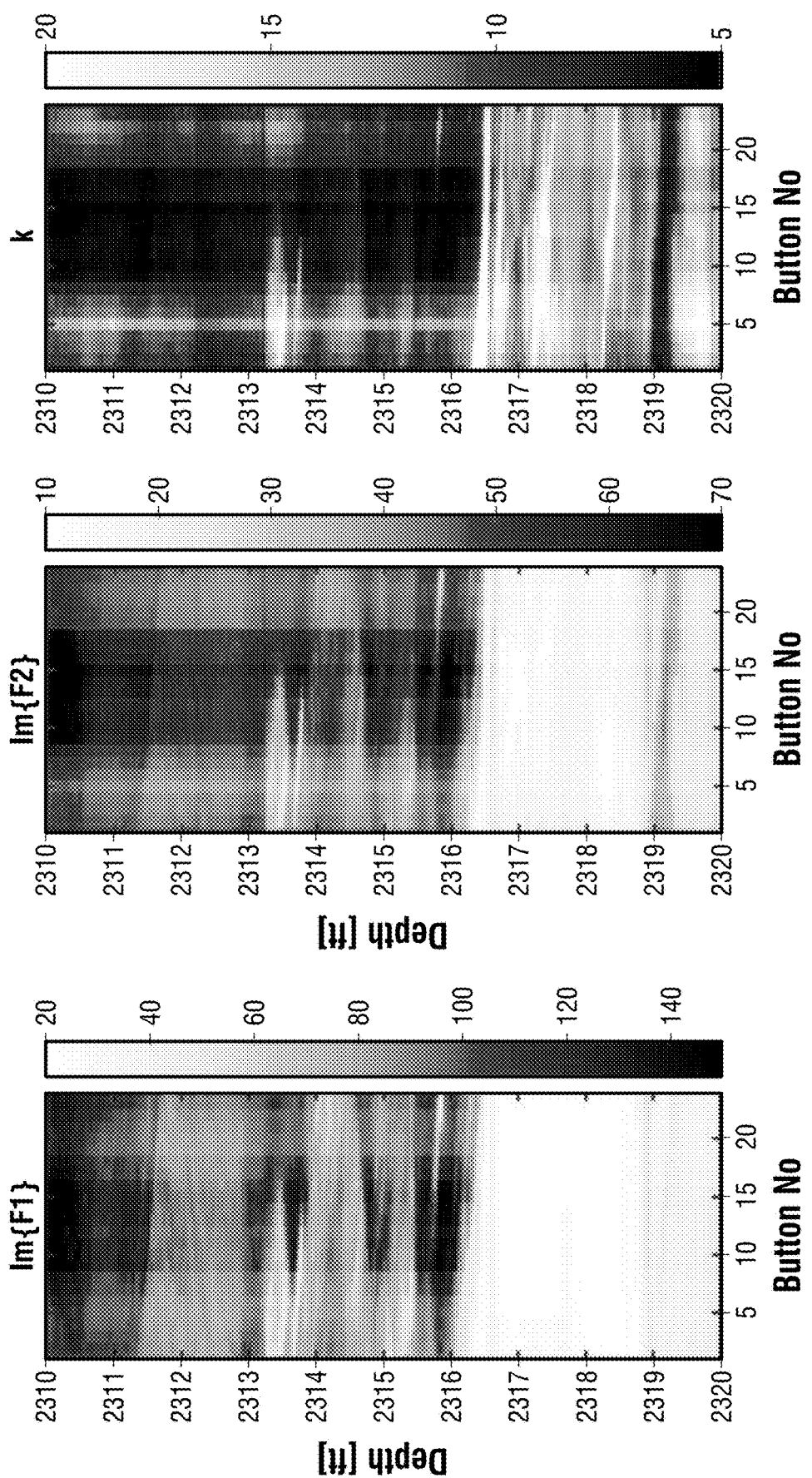
FIGS. 6A-6C illustrate a formation dielectric image from an impedance at two frequencies.

FIGS. 5A-5C show, from left to right respectively, the real part of impedance measured at frequency $f_1$ (e.g., FIG. 5A), the real part of impedance measured at frequency $f_2$ (e.g., FIG. 5b), and the formation resistivity obtained (e.g., FIG. 5C) from Equations 5-8. FIGS. 6A-6C show, from left to right respectively, the imaginary part of impedance measured at frequency $f_1$ (e.g., FIG. 6A), the real part of impedance measured at frequency $f_2$ (e.g., FIG. 6B), and the formation dielectric constant obtained (e.g., FIG. 6C) from Equations 5-8.

Accordingly, a system and method for correcting for a dielectric effect and obtaining an accurate resistivity estimate from a downhole device may be provided. The systems and methods disclosed herein may include any of the various features of the systems and methods disclosed herein, including one or more of the following statements.

Statement 1: A method for estimating a resistivity of a formation may comprise disposing a downhole tool into a borehole, wherein the downhole tool comprises a pad, an injector electrode, and a return electrode; injecting a current signal into the formation from the injector electrode; measuring a voltage signal between the injector electrode and the return electrode; and determining a formation resistivity and a formation dielectric constant from at least the voltage signal, at least one property of the downhole tool, and at least one property of the borehole.

Statement 2: The method of statement 1 or statement 2, further comprising measuring a first impedance at a first frequency and measuring a second impedance at a second frequency.

Statement 3: The method of any preceding statement, wherein the determining the formation resistivity and the formation dielectric constant from at least two of the voltage signal, the at least one property of the downhole tool, and the at least one property of the borehole.

Statement 4: The method of any preceding statement, further comprising determining the first impendence at the first frequency using $$Z_1 = \left(\rho_{M1}\frac{h}{A}\right)\left[\frac{1-j[2\pi\varepsilon_0(\rho_{M1}f_1k_{M1})]}{1+[2\pi\varepsilon_0(\rho_{M1}f_1k_{M1})]^2}\right] + \left(\rho_f\frac{d}{A}\right)\left[\frac{1-j[2\pi\varepsilon_0(\rho_F f_1k_F)]}{1+[2\pi\varepsilon_0(\rho_F f_1k_F)]^2}\right]$$

and determining the second impedance the second frequency using $$Z_2 = \left(\rho_{M2}\frac{h}{A}\right)\left[\frac{1 - j[2\pi\varepsilon_0(\rho_{M2}f_2k_{M2})]}{1 + [2\pi\varepsilon_0(\rho_{M2}f_2k_{M2})]^2}\right] + \left(\rho_F\frac{d}{A}\right)\left[\frac{1 - j[2\pi\varepsilon_0(\rho_F f_2k_F)]}{1 + [2\pi\varepsilon_0(\rho_F f_2k_F)]^2}\right].$$

Statement 5: The method of any preceding statement, wherein the at least one property of the borehole is a mud impedance, a formation impedance, a mud resistance, a formation resistance, a mud capacitance, or a formation capacitance.

Statement 6: The method of any preceding statement, further comprising calculating a standoff of the injector electrode and identifying a characteristic of a borehole geometry from the standoff.

Statement 7: A method for estimating a resistivity of a formation may comprise disposing a downhole tool into a borehole, wherein the downhole tool comprises a pad, an injector electrode, and a return electrode; injecting a voltage signal between the injector electrode and the return electrode; measuring a current signal between the injector electrode and the return electrode; measuring a first impedance at a plurality of frequencies; measuring a second impedance at the plurality of frequencies; and determining a plurality of formation resistivities and a plurality of formation dielectric constants from at least the voltage signal, the first impedance, the second impedance, and a property of the downhole tool.

Statement 8: The method of statement 7, further comprising performing a statistical measurement of the plurality of formation resistivities.

Statement 9: The method of statement 7 or statement 8, wherein the statistical measurement is a mean, median, or frequency weighted mean.

Statement 10: The method of statement 7 to statement 9, further comprising performing a statistical measurement of the plurality of formation dielectric constants.

Statement 11: The method of statement 7 to statement 10, wherein the statistical measurement is a mean, median, or frequency weighted mean.

Statement 12: A system for estimating a resistivity of a formation may comprise a downhole tool, wherein the downhole tool comprises: an arm; and a pad, wherein the pad comprises an injector electrode and a return electrode; a conveyance for disposing the downhole tool in a borehole; and an information handling system, wherein the information handling system is configured to determine a formation resistivity and a formation dielectric constant from at least a voltage signal, at least one property of the downhole tool, and at least one property of the borehole.

Statement 13: The system of statement 12, wherein the information handling system is further configured to identify a first impedance from a first frequency.

Statement 14: The system of statement 12 or statement 13, wherein the information handling system is further configured to identify a second impedance from a second frequency.

Statement 15: The system of statement 12 to statement 14, wherein the information handling system is further configured to perform a statistical measurement of the plurality of formation resistivities and wherein the statistical measurement is a mean, median, or frequency weighted mean.

Statement 16: The system of statement 12 to statement 15, wherein the information handling system is further configured to perform a statistical measurement of the plurality of formation dielectric constant and wherein the statistical measurement is a mean, median, or frequency weighted mean.

Statement 17: The system of statement 12 to statement 16, wherein the information handling system is further configured to determine a first impedance at a first frequency using $$Z_1 = \left(\rho_{M1}\frac{h}{A}\right)\left[\frac{1 - j[2\pi\varepsilon_0(\rho_{M1}f_1k_{M1})]}{1 + [2\pi\varepsilon_0(\rho_{M1}f_1k_{M1})]^2}\right] + \left(\rho_F\frac{d}{A}\right)\left[\frac{1 - j[2\pi\varepsilon_0(\rho_F f_1k_F)]}{1 + [2\pi\varepsilon_0(\rho_F f_1k_F)]^2}\right]$$

and determine a second impedance from a second frequency using $$Z_2 = \left(\rho_{M2}\frac{h}{A}\right)\left[\frac{1 - j[2\pi\varepsilon_0(\rho_{M2}f_2k_{M2})]}{1 + [2\pi\varepsilon_0(\rho_{M2}f_2k_{M2})]^2}\right] + \left(\rho_F\frac{d}{A}\right)\left[\frac{1 - j[2\pi\varepsilon_0(\rho_F f_2k_F)]}{1 + [2\pi\varepsilon_0(\rho_F f_2k_F)]^2}\right].$$

Statement 18: The system of statement 12 to statement 17, wherein the at least one property of the borehole is a mud impedance, a formation impedance, a mud resistance, a formation resistance, a mud capacitance, or a formation capacitance.

Statement 19: The system of statement 12 to statement 18, wherein the at least on property of the downhole tool is an effective cross-sectional area of the electrode.

Statement 20: The system of statement 12 to statement 19, wherein the information handling system is further configured to calculate a standoff of the injector electrode and identify a characteristic of a borehole geometry from the standoff.

Although the present disclosure and its advantages have been described in detail, it should be understood that various changes, substitutions and alterations may be made herein without departing from the spirit and scope of the disclosure as defined by the appended claims. The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the elements that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method for estimating a resistivity of a formation, comprising:
    disposing a downhole tool into a borehole, wherein the downhole tool comprises a pad, an injector electrode, and a return electrode;
    injecting current signals into the formation from the injector electrode at a first frequency and a second frequency;
    measuring voltage signals between the injector electrode and the return electrode at the first frequency and the second frequency;
    calculating a first impedance at the first frequency and calculating a second impedance at the second frequency;
    determining the first impedance at the first frequency using $$Z_1 = \left(\rho_{M1}\frac{h}{A}\right)\left[\frac{1-j[2\pi\varepsilon_0(\rho_{M1}f_1 k_{M1})]}{1+[2\pi\varepsilon_0(\rho_{M1}f_1 k_{M1})]^2}\right] + \left(\rho_F\frac{d}{A}\right)\left[\frac{1-j[2\pi\varepsilon_0(\rho_F f_1 k_F)]}{1+[2\pi\varepsilon_0(\rho_F f_1 k_F)]^2}\right]$$

and determining the second impedance at the second frequency using $$Z_2 = \left(\rho_{M2}\frac{h}{A}\right)\left[\frac{1-j[2\pi\varepsilon_0(\rho_{M2}f_2 k_{M2})]}{1+[2\pi\varepsilon_0(\rho_{M2}f_2 k_{M2})]^2}\right] + \left(\rho_F\frac{d}{A}\right)\left[\frac{1-j[2\pi\varepsilon_0(\rho_F f_2 k_F)]}{1+[2\pi\varepsilon_0(\rho_F f_2 k_F)]^2}\right],$$

wherein $\rho_{M1}$ and $\rho_{M2}$ denote the mud resistivity at frequencies $f_1$ and $f_2$ respectively, $k_{M1}$ and $k_{M2}$ denote the mud dielectric constant at frequencies $f_1$ and $f_2$ respectively, $\rho_F$ denotes the formation resistivity, $k_F$ denotes the formation dielectric constant, h denotes the standoff, A denotes the area of the injector electrode, d denotes the effective depth of investigation, and $\varepsilon_0$ is the dielectric permittivity of the vacuum; and
    determining both a formation resistivity and a formation dielectric constant from the voltage signals at the first frequency and at the second frequency.

2. The method of claim 1, wherein determining both the formation resistivity and the formation dielectric constant from the voltage signals at the first frequency and at the second frequency, further comprises from at least one property of the downhole tool, and at least one property of the borehole.

3. The method of claim 1, wherein the at least one property of the borehole is a mud impedance, a formation impedance, a mud resistance, a formation resistance, a mud capacitance, or a formation capacitance.

4. The method of claim 1, further comprising calculating a standoff of the injector electrode and identifying a characteristic of a borehole geometry from the standoff.

5. The method of claim 1, further comprising performing a statistical measurement of the plurality of formation resistivities.

6. The method of claim 1, further comprising performing a statistical measurement of the plurality of formation dielectric constants.

7. A method for estimating a resistivity of a formation, comprising:
    disposing a down hole tool into a borehole, wherein the downhole tool comprises a pad, an injector electrode, and a return electrode;
    injecting a voltage signal between the injector electrode and the return electrode at a first frequency and a second frequency;
    measuring a current signal between the injector electrode and the return electrode at a first frequency and a second frequency;
    calculating a first impedance at a first frequency and calculating a second impedance at a second frequency;
    determining the first impedance at the first frequency using $$Z_1 = \left(\rho_{M1}\frac{h}{A}\right)\left[\frac{1-j[2\pi\varepsilon_0(\rho_{M1}f_1 k_{M1})]}{1+[2\pi\varepsilon_0(\rho_{M1}f_1 k_{M1})]^2}\right] + \left(\rho_F\frac{d}{A}\right)\left[\frac{1-j[2\pi\varepsilon_0(\rho_F f_1 k_F)]}{1+[2\pi\varepsilon_0(\rho_F f_1 k_F)]^2}\right]$$

and determining the second impedance at the second frequency using $$Z_2 = \left(\rho_{M2}\frac{h}{A}\right)\left[\frac{1-j[2\pi\varepsilon_0(\rho_{M2}f_2 k_{M2})]}{1+[2\pi\varepsilon_0(\rho_{M2}f_2 k_{M2})]^2}\right] + \left(\rho_F\frac{d}{A}\right)\left[\frac{1-j[2\pi\varepsilon_0(\rho_F f_2 k_F)]}{1+[2\pi\varepsilon_0(\rho_F f_2 k_F)]^2}\right],$$

wherein $\rho_{M1}$ and $\rho_{M2}$ denote the mud resistivity at frequencies $f_1$ and $f_2$ respectively, $k_{M1}$ and $k_{M2}$ denote the mud dielectric constant at frequencies $f_1$ and $f_2$ respectively, $\rho_F$ denotes the formation resistivity, $k_F$ denotes the formation dielectric constant, h denotes the standoff, A denotes the area of the injector electrode, d denotes the effective depth of investigation, and $\varepsilon_0$ is the dielectric permittivity of the vacuum; and
    determining both a plurality of formation resistivities and a plurality of formation dielectric constants from the current signal at the first frequency and the second frequency.

8. The method of claim 7, further comprising performing a statistical measurement of the plurality of formation resistivities.

9. The method of claim 8, wherein the statistical measurement is a mean, median, or frequency weighted mean.

10. The method of claim 7, further comprising performing a statistical measurement of the plurality of formation dielectric constants.

11. The method of claim 10, wherein the statistical measurement is a mean, median, or frequency weighted mean.

12. The method of claim 7, further comprising calculating a standoff of the injector electrode and identifying a characteristic of a borehole geometry from the standoff.

13. A system for estimating a resistivity of a formation, comprising:
a down hole tool, wherein the downhole tool comprises:
a pad, wherein the pad comprises an injector electrode and a return electrode; and
a conveyance for disposing the down hole tool in a borehole; and
an information handling system for:
determining a first impedance at a first frequency using $$Z_1 = \left(\rho_{M1}\frac{h}{A}\right)\left[\frac{1-j[2\pi\varepsilon_0(\rho_{M1}f_1k_{M1})]}{1+[2\pi\varepsilon_0(\rho_{M1}f_1k_{M1})]^2}\right] + \left(\rho_F\frac{d}{A}\right)\left[\frac{1-j[2\pi\varepsilon_0(\rho_F f_1 k_F)]}{1+[2\pi\varepsilon_0(\rho_F f_1 k_F)]^2}\right]$$

and determining a second impedance at a second frequency using $$Z_2 = \left(\rho_{M2}\frac{h}{A}\right)\left[\frac{1-j[2\pi\varepsilon_0(\rho_{M2}f_2k_{M2})]}{1+[2\pi\varepsilon_0(\rho_{M2}f_2k_{M2})]^2}\right] + \left(\rho_F\frac{d}{A}\right)\left[\frac{1-j[2\pi\varepsilon_0(\rho_F f_2 k_F)]}{1+[2\pi\varepsilon_0(\rho_F f_2 k_F)]^2}\right],$$

wherein $\rho_{M1}$ and $\rho_{M2}$ denote the mud resistivity at frequencies $f_1$ and $f_2$ respectively, $k_{M1}$ and $k_{M2}$ denote the mud dielectric constant at frequencies $f_1$ and $f_2$ respectively, $\rho_F$ denotes the formation resistivity, $k_F$ denotes the formation dielectric constant, h denotes the standoff, A denotes the area of the injector electrode, d denotes the effective depth of investigation, and $\varepsilon_0$ is the dielectric permittivity of the vacuum; and
determining both a formation resistivity and a formation dielectric constant from at least a voltage signal at a first frequency and a second frequency, at least one property of the downhole tool, and at least one property of the borehole.

14. The system of claim 13, wherein the information handling system further identifies a first impedance from a first frequency.

15. The system of claim 14, wherein the information handling system further identifies a second impedance from a second frequency.

16. The system of claim 15, wherein the information handling system further performs a statistical measurement of the formation resistivity and wherein the statistical measurement is a mean, median, or frequency weighted mean.

17. The system of claim 15, wherein the information handling system further performs a statistical measurement of the formation dielectric constant and wherein the statistical measurement is a mean, median, or frequency weighted mean.

18. The system of claim 13, wherein the at least one property of the borehole is a mud impedance, a formation impedance, a mud resistance, a formation resistance, a mud capacitance, or a formation capacitance.

19. The system of claim 13, wherein the at least one property of the downhole tool is an effective cross-sectional area of the injector electrode.

20. The system of claim 13, wherein the information handling system further calculates a standoff of the injector electrode and identifies a characteristic of a borehole geometry from the standoff.

21. A method for estimating a resistivity of a formation, comprising:
disposing a down hole tool into a borehole, wherein the downhole tool comprises a pad, an injector electrode, and a return electrode;
injecting a current signal into the formation from the injector electrode;
measuring a voltage signal between the injector electrode and the return electrode;
calculating a first impedance at a first frequency and calculating a second impedance at a second frequency;
determining the first impedance at the first frequency using $$Z_1 = \left(\rho_{M1}\frac{h}{A}\right)\left[\frac{1-j[2\pi\varepsilon_0(\rho_{M1}f_1k_{M1})]}{1+[2\pi\varepsilon_0(\rho_{M1}f_1k_{M1})]^2}\right] + \left(\rho_F\frac{d}{A}\right)\left[\frac{1-j[2\pi\varepsilon_0(\rho_F f_1 k_F)]}{1+[2\pi\varepsilon_0(\rho_F f_1 k_F)]^2}\right]$$

and determining the second impedance at the second frequency using $$Z_2 = \left(\rho_{M2}\frac{h}{A}\right)\left[\frac{1-j[2\pi\varepsilon_0(\rho_{M2}f_2k_{M2})]}{1+[2\pi\varepsilon_0(\rho_{M2}f_2k_{M2})]^2}\right] + \left(\rho_F\frac{d}{A}\right)\left[\frac{1-j[2\pi\varepsilon_0(\rho_F f_2 k_F)]}{1+[2\pi\varepsilon_0(\rho_F f_2 k_F)]^2}\right],$$

wherein $\rho_{M1}$ and $\rho_{M2}$ denote the mud resistivity at frequencies $f_1$ and $f_2$ respectively, $k_{M1}$ and $k_{M2}$ denote the mud dielectric constant at frequencies $f_1$ and $f_2$ respectively, $\rho_F$ denotes the formation resistivity, $k_F$ denotes the formation dielectric constant, h denotes the standoff, A denotes the area of the injector electrode, d denotes the effective depth of investigation, and $\varepsilon_0$ is the dielectric permittivity of the vacuum;
determining a formation resistivity and a formation dielectric constant from at least one of the voltage signal, at least one property of the downhole tool, and at least one property of the borehole; and
calculating a standoff of the injector electrode and identifying a borehole characteristic of a borehole geometry from the standoff.

22. A system for estimating a resistivity of a formation, comprising:
a downhole tool, wherein the downhole tool comprises:
a pad, wherein the pad comprises an injector electrode and a return electrode; and
a conveyance for disposing the downhole tool in a borehole; and
an information handling system for:
determining a first impedance at a first frequency using $$Z_1 = \left(\rho_{M1}\frac{h}{A}\right)\left[\frac{1-j[2\pi\varepsilon_0(\rho_{M1}f_1k_{M1})]}{1+[2\pi\varepsilon_0(\rho_{M1}f_1k_{M1})]^2}\right] + \left(\rho_F\frac{d}{A}\right)\left[\frac{1-j[2\pi\varepsilon_0(\rho_F f_1 k_F)]}{1+[2\pi\varepsilon_0(\rho_F f_1 k_F)]^2}\right]$$

and determining a second impedance at a second frequency using $$Z_2 = \left(\rho_{M2}\frac{h}{A}\right)\left[\frac{1-j[2\pi\varepsilon_0(\rho_{M2}f_2k_{M2})]}{1+[2\pi\varepsilon_0(\rho_{M2}f_2k_{M2})]^2}\right] + \left(\rho_F\frac{d}{A}\right)\left[\frac{1-j[2\pi\varepsilon_0(\rho_F f_2 k_F)]}{1+[2\pi\varepsilon_0(\rho_F f_2 k_F)]^2}\right],$$

wherein $\rho_{M1}$ and $\rho_{M2}$ denote the mud resistivity at frequencies $f_1$ and $f_2$ respectively, $k_{M1}$ and $k_{M2}$ denote the mud dielectric constant at frequencies $f_1$ and $f_2$ respectively, $\rho_F$ denotes the formation resistivity, $k_F$ denotes the formation dielectric constant, h denotes the standoff, A denotes the area of the injector electrode, d denotes the effective depth of investigation, and $\varepsilon_0$ is the dielectric permittivity of the vacuum;

determining a formation resistivity and a formation dielectric constant from at least a voltage signal, at least one property of the downhole tool, and at least one property of the borehole; and calculating a standoff of the injector electrode and identifying a borehole characteristic of a borehole geometry from the standoff.

* * * * *